US008550657B2

(12) United States Patent
Quach (10) Patent No.: US 8,550,657 B2
(45) Date of Patent: Oct. 8, 2013

(54) METHODOLOGY OF MAINTAINING CCT FOR WHITE LIGHT USING LED

(75) Inventor: Phi Hung Quach, Perai (MY)

(73) Assignee: Itramas International, Inc., Selangor (MY)

( * ) Notice: Subject to any disclaimer, the term of this patent is extended or adjusted under 35 U.S.C. 154(b) by 858 days.

(21) Appl. No.: 12/267,135

(22) Filed: Nov. 7, 2008

(65) Prior Publication Data

US 2010/0118374 A1    May 13, 2010

(51) Int. Cl.
*F21V 9/00*    (2006.01)
(52) U.S. Cl.
USPC .................... 362/231; 362/249.02
(58) Field of Classification Search
USPC ............................ 362/231, 249.02
See application file for complete search history.

(56) References Cited

U.S. PATENT DOCUMENTS

| 5,821,867 | A | 10/1998 | Angell et al. |
| 6,373,568 | B1 | 4/2002 | Miller et al. |
| 6,411,046 | B1 | 6/2002 | Muthu |
| 6,741,351 | B2 * | 5/2004 | Marshall et al. ............. 356/406 |
| 7,312,430 | B2 | 12/2007 | Wong et al. |
| 7,604,360 | B2 | 10/2009 | Chen et al. |
| 7,619,192 | B2 | 11/2009 | Sun et al. |
| 7,732,753 | B2 | 6/2010 | Greiner |
| 7,845,824 | B2 * | 12/2010 | Robotham ..................... 362/231 |
| 2007/0007431 | A1 * | 1/2007 | Wong et al. .................. 250/205 |
| 2008/0112164 | A1 | 5/2008 | Teshrirogi |

FOREIGN PATENT DOCUMENTS

| KR | 723912 B1 | 5/2007 |
| WO | WO 2006119750 A2 * | 11/2006 |

OTHER PUBLICATIONS

Co-pending U.S. Appl. No. 12/267,192, filed Nov. 7, 2008.
Co-pending U.S. Appl. No. 12/266,741, filed Nov. 7, 2008.
The Office Action in co-pending U.S. Appl. No. 12/267,192, mailed Aug. 17, 2010, 10 pages.

* cited by examiner

*Primary Examiner* — Sean Gramling
(74) *Attorney, Agent, or Firm* — Preston Smirman; Smirman IP Law, PLLC (57) ABSTRACT

The present invention relates generally to a methodology of maintaining correlated color temperature (CCT) of light beam from lighting means by having a processing means to instruct several lighting means groups, wherein each group has different CCT ranges, that are arranged together, to provide light beam of intended CCT, if the CCT of light beam from the lighting means that are reflected back using reflecting means, which are captured and converted to binary data by the sensory means are different from the intended CCT.

7 Claims, 6 Drawing Sheets

METHODOLOGY OF MAINTAINING CCT FOR WHITE LIGHT USING LED

TECHNICAL FIELD OF INVENTION

The present invention relates generally to a methodology of maintaining correlated colour temperature (CCT) of light beam from lighting means by having a processing means to instruct several lighting means groups, wherein each group has different CCT ranges, that are arranged together, to provide light beam of intended CCT, if the CCT of light beam from the lighting means that are reflected back using reflecting means, which are captured and converted to binary data by the sensory means are different from the intended CCT.

BACKGROUND OF THE INVENTION

Colour temperature is a characteristic of visible light and usually determined by comparing its chromaticity with an ideal black-body radiator. The measurement for colour temperature is Kelvin (K). Examples of warm colours (with lower Kelvin value) are yellow and red while examples of cool colours (with higher Kelvin value) are blue and green. Warmer colour temperatures are suitable for living spaces while cooler colour temperatures are suitable for visual tasks. Recommended colour temperatures for general indoor and task lighting are in the 2580K-3710K range.

CCT is the colour temperature of the black body radiator which has the closest matches to the light from the lamp to the human colour perception. This is because the lighting sources emit light primarily by mean of processes rather than increasing the temperature of the body.

Visible white light consists of electromagnetic radiation of various wavelengths. The colours are conventionally divided into red, orange, yellow, green, blue, indigo, and violet. Red, green and blue light are additive primary colours, which in combination will produce almost all colours, including white.

An impression of white light can be created by mixing appropriate intensities of primary colours of light (red, green and blue), a process called additive mixing as seen in many display technologies. Computer displays often have a colour temperature control, allowing user to select the colour temperature (usually from a small set of fixed values) of the light emitted when the computer produces the electrical signal corresponding to "white".

Solid state lighting that utilizes light emitting diodes as sources is replacing electrical filaments or gas because it creates visible light with reduced heat generation or parasitic energy dissipation and more resistance to shock and wear, therefore increasing the lifespan.

Light emitting diode (LED) lamp is a type of solid state lighting that comprises light emitting diodes as source of lighting instead of electrical filaments or gas. LED lamps usually contain clusters of LEDs in an appropriate housing. The housing used for the LED lamp usually has an opening to direct the light from the LEDs to the intended direction. The said housing opening is usually made of transparent material in order to transfer a large percentage of light beams from the LED lamp to the intended space.

U.S. Pat. No. 6,741,35, discloses a white light emitting luminaire with light sensor configurations for optical feedback. The luminaire includes a condenser lens to direct the combined light output from the array of LEDs to a target light guide, which has a partial reflecting element to reflect certain portion of the light output from the condenser lens back towards the LED array. The specification of U.S. Pat. No. 6,741,351 is hereby incorporated by reference into this specification.

The arrangement in U.S. Pat. No. 6,741,351, needed an extra condenser lens and partial reflecting element in order to reflect back a small percentage of light back to towards the LED array. There is a need for a more efficient and cost effective method to reflect the light back the LED array by having less components.

Furthermore, the angle of lighting from the each LED is usually in the range of 90°-120°, which is relatively wide. Although this wide angle light can be used to light up a larger area, high energy consumption is needed in order to light the area because a wide angle of lighting will lead to divergence of light and causes low brightness.

Due to the fact that LED can only produce one single colour, there are a few methods to convert it into white light. The first method is wavelength conversion, wherein LED colours are accompanied with phosphors of different colour. For example, blue LED with yellow phosphor, blue LED with several colours of phosphors, ultraviolet LED with red, green and blue phosphors, or blue LED with quantum dots.

The second method is colour mixing, wherein the usage of a plurality of LEDs with different colours, combined together in the correct proportion in order to produce white light. Several combinations can be done, such as two LEDs of blue and yellow colour; three LEDs of red, blue and green; or four LEDs of red, blue, green and yellow. Since no phosphors are used for this method, there will be no energy loss in conversion process, resulting in higher efficiency. Although a colour mixing concept of single colour LEDs such as red, green, blue and yellow can be used to create white light, the brightness of each LED is limited compared to white LED. Therefore, using colour mixing of single colour LEDs will need extra energy or higher quantity in order to create the same luminous flux as white LEDs with different CCT ranges.

White LED is created by having a blue LED and a phosphor coating to mix yellow light with blue in order to produce light that appears to be white. Nevertheless, if white LED is used alone in the LED lamp, the colour temperature of the said LED lamp cannot be controlled because LED can degrade in time. Degradation happens especially to phosphor based LEDs due to the heat loss from the Stokes shift. Furthermore, the different phosphors used in white LEDs, which will degrade with heat and age, but at different rates will cause changes to the produced CCT of the light output.

If a certain confined room contains several white LED lamps, which will degrade at different rates due to heat and age, there will be inconformity between the lamps, which may create undesirable CCT to the room given time. The usual solution to this problem would be to either change the white LED lamps or change the LED components in the lamp, which incurs extra cost and manpower.

Another condition whereby a certain confined room may have white LED lamps of inconsistent CCT is when the room comprises of new and old LED lamps, LED lamps from different manufacturing bins or batches or comprises of different models of LED lamps. Conventionally, one way to solve the problem of CCT inconsistency among several LED lamps in the same room due to the different degrading speed of each LED lamps is to order LED lamps from a narrower manufacturing bin, wherein manufacturers will choose the LEDs from a narrower bin to ensure LED lamps do not degrade too extensively among each other.

Different CCT of white lighting is suitable for different usage in the space of lighting. For example, warmer colour temperature is suitable for living spaces while cooler colour temperature is suitable for visual tasks. Different user of lighting space will have different preference on the CCT of the white lighting. If the same space of lighting is used for different purposes and different users, there is a need to have an easy way to change the CCT of the white lighting source. Nevertheless, if a white LED lamp contains only white LEDs, the user will not be able to control the CCT of the lamp because white LEDs have fixed CCT, unless the user changes the hardware (ie white LEDs) in the lamp to produce different CCT.

Due to the different degradation rate of LED lamps in a single room, possibility of having old and new LED lamps in the same room, possibility of having LED lamps of different manufacturing bins or batches, and possibilities of having different models of LED lamps, which leads of inconsistency in the CCT in the room, there is a need to maintain the desired CCT of light beam that is being emitted from the LED lamps, without the need for any hardware replacement.

The present invention overcomes, or at least partly alleviates the above shortcomings by providing a methodology of maintaining CCT of light beam from lighting means such as LED lamp, wherein steps comprising: transmitting light from lighting means through confined space, having a percentage of said light transmitted back towards sensory means by reflecting means having sensory means located behind the lighting means to capture reflected light beam, having sensory means to read CCT of reflected light beam, having sensory means to convert CCT reading into binary data, having at least one any acceptable processing means to compare binary data obtained from sensory means against intended CCT binary data, having said processing means to instruct said lighting means to transmit lower CCT of lighting beam if obtained CCT binary is higher than the intended CCT binary data for a certain acceptable threshold to maintain intended CCT to be transmitted from the light means; or vice versa; and repeating the steps mentioned continuously throughout operation duration.

The present invention also overcomes, or at least partly alleviates the above shortcomings by providing a methodology of creating lighting of white colour with intended CCT, whereby the usage of any combination of cool white, white, warm white and amber LEDs with CCT ranges of 5000K and 7000K, 3700K and 5000K, 2500K and 3700K, and DWL ranges of 585 nm and 595 nm are used in the LED lamp; furtherance comprising a processing means in order to control the CCT of the lighting source depending on the preference and usage of the user.

The present invention also overcomes, or at least partly alleviates the above shortcomings by providing a methodology of light feedback system for lighting means, whereby the light that is transmitted from the lighting means such as LED array is being reflected back to the sensory system located at the back of the LED array by a reflecting means, which is part of the housing; said sensory system comprises a light guide with a large viewing angle and a colour sensor; and said light from the lighting means can be transmitted through an optional focus lens to provide a narrower lighting angle (e.g. 10° (spot model) or 30° (flood model) viewing angle).

SUMMARY OF THE INVENTION

Accordingly, it is the primary aim of the present invention to provide a methodology of maintaining CCT of light beam from lighting means to ensure the said lighting means is able to maintain the desired CCT of white lighting sources when the lighting source contains a plurality of cool white LEDs, white LEDs, warm LEDs and amber LEDs.

It is yet another object of the present invention to provide a methodology of maintaining CCT of light beam from lighting means, wherein the user is able to control the CCT of the white lighting source according to the user's preference and usage without the need to replace the hardware.

It is yet another object of the present invention to provide a methodology of maintaining CCT of light beam from lighting means, wherein the user is able to control the brightness of the white lighting source according to the user's preference and usage without the need to replace the hardware.

It is yet another object of the present invention to provide a methodology of maintaining CCT of light beam from lighting means in order to eliminate the problem of CCT inconsistency caused by situations such as: having old and new lamps in the same room, having LED lamps from different manufacturing bins or batches in the same room, or having different models of LED lamps in the same room.

It is yet another object of the present invention to provide a methodology of maintaining CCT of light beam from lighting means, wherein said reflecting means can reflect back to a sensory means located behind said lighting means.

It is yet another object of the present invention to provide a methodology of maintaining CCT of light beam from lighting means, wherein said light feedback system is made of acrylic, which is light, high transparency and durable.

It is yet another object of the present invention to provide a methodology of maintaining CCT of light beam from lighting means, wherein said light feedback system can be made of other materials with similar characteristics to acrylic.

It is yet another object of the present invention to provide a methodology of maintaining CCT of light beam from lighting means, wherein said light feedback system is part of the lighting means housing to maintain a low amount of component to the lighting means.

It is yet another object of the present invention to provide a methodology of maintaining CCT of light beam from lighting means, wherein said light feedback system will reflect and converge the light beams from the lighting means to the sensory system.

It is yet another object of the present invention to provide a methodology of maintaining CCT of light beam from lighting means, wherein said sensory system comprises a light guide with a large viewing angle in order to absorb more light reflected from the reflecting means.

It is yet another object of the present invention to provide a methodology of creating lighting of white colour with the intended CCT to ease the user to control CCT of white lighting sources when the lighting source contains a plurality of cool white LEDs (not shown), white LEDs (308), warm white LEDs (302) and amber LEDs (300).

It is yet another object of the present invention to provide a methodology of creating lighting of white colour with intended CCT, wherein the user is able to control the CCT of the white lighting source according to the user's preference and usage without the need to replace the hardware.

It is yet another object of the present invention to provide a methodology of creating lighting of white colour with intended CCT, wherein the user is able to control the brightness of the white lighting source according to the user's preference and usage without the need to replace the hardware.

It is yet another object of the present invention to provide a methodology of creating lighting of white colour with intended CCT, wherein the optimum amount of lighting means groups and the amount of lighting means inside said lighting means groups is chosen to maintain a balance between cost of the LED lamp and the brightness of the LED lamp.

It is yet another object of the present invention to provide a methodology of light feedback system for lighting means wherein said reflecting means (100, 204) can reflect back to a sensory means located behind said lighting means.

It is yet another object of the present invention to provide a methodology of light feedback system for lighting means whereby said light feedback system is made of acrylic, which is light, high transparency and durable.

It is yet another object of the present invention to provide a methodology of light feedback system for lighting means whereby said light feedback system can be made of other materials with similar characteristics to acrylic It is yet another object of the present invention to provide a methodology of light feedback system for lighting means whereby said light feedback system is part of the lighting means housing to maintain a low amount of component to the lighting means.

It is yet another object of the present invention to provide a methodology of light feedback system for lighting means whereby said light feedback system will reflect and converge the light beams from the lighting means to the sensory system.

It is yet another object of the present invention to provide a methodology of light feedback system for lighting means further comprising an optional focus lens attached to the reflecting means (204) to provide a narrower lighting angle such as 10° or 30° viewing angle for the LED lamp to provide more focused and sharper lighting and higher brightness.

It is yet another object of the present invention to provide a methodology of light feedback system for lighting means whereby said sensory system comprises a light guide with a large viewing angle in order to absorb more light reflected from the reflecting means.

It is yet another object of the present invention to provide a methodology of light feedback system for lighting means whereby said sensory system further comprises a colour sensor to measure correlated colour temperature (CCT) of reflected light.

Other and further objects of the invention will become apparent with an understanding of the following detailed description of the invention or upon employment of the invention in practice.

According to a preferred embodiment of the present invention there is provided,

A methodology of maintaining correlated colour temperature (CCT) of light beam from lighting means, the steps comprising:
  i. transmitting light from lighting means through confined space;
  ii. having a percentage of said light transmitted back towards lighting means by reflecting means;
  iii. having sensory means located behind the lighting means to capture reflected light beam;
characterized in that
  iv. said sensory means reading CCT of the reflected light beam (104);
  v. said sensory means converting CCT reading into binary data (not shown);
  vi. at least one any acceptable processing means comparing binary data obtained from sensory means against intended CCT binary data (106);
  vii. having said processing means to instruct said lighting means to adjust CCT of lighting beam if binary data obtained from sensory means is not within a certain acceptable threshold range of the intended CCT binary data (108);
  viii. having said processing means and sensory means continue steps iv to vii until the intended CCT is obtained (112);
  ix. having said processing means to continue steps iv to viii (114) if binary data obtained from sensory means is within a certain acceptable threshold range of the intended CCT binary data (108).

In another embodiment, the present invention provides,

A methodology of maintaining correlated colour temperature (CCT) of light beam from lighting means, the steps comprising:
  i. transmitting light from lighting means through confined space;
  ii. having a percentage of said light transmitted back towards lighting means by reflecting means;
  iii. having sensory means located behind the lighting means to capture reflected light beam;
characterized in that
  iv. said sensory means reading CCT of the reflected light beam:
  v. said sensory means converting CCT reading into binary data;
  vi. at least one any acceptable processing means comparing binary data obtained from sensory means against intended CCT binary data;
  vii. having said processing means to instruct said lighting means to adjust CCT of lighting beam if binary data obtained from sensory means is not within a certain acceptable threshold range of the intended CCT binary data (108);
  viii. having said processing means and sensory means continue steps iv to vii until the intended CCT is obtained (112);
  ix. having said processing means to instruct the lighting means to transmit lighting of the latest previous CCT (200) if binary data obtained from sensory means is within a certain acceptable threshold range of the intended CCT binary data (108).

In another embodiment, the present invention provides,

A methodology of creating lighting of white colour with the intended CCT, the steps comprising:
  combining of plurality of lighting means groups with different CCT ranges;
  having processing means to instruct said plurality of lighting means groups to provide lighting of a fixed CCT;
characterized in that
said lighting means group comprises:
  a plurality of lighting means with DWL range of 585 nm and 595 nm;
  a plurality of lighting means with CCT range of 2500K and 3700K;
  a plurality of lighting means with CCT range of 3700K and 5000K.

In another embodiment, the present invention provides,

A methodology of creating lighting of white colour with the intended CCT, the steps comprising:
  combining of plurality of lighting means groups with different CCT ranges;
  having processing means to instruct said plurality of lighting means groups to provide lighting of a fixed CCT;
characterized in that
said lighting means group comprises:
  a plurality of lighting means with CCT range of 2500K and 3700K;

a plurality of lighting means with CCT range of 3700K and 5000K;

a plurality of lighting means with CCT range of 5000K and 7000K.

In another embodiment, the present invention provides,

A methodology of creating lighting of white colour with the intended CCT, the steps comprising:

combining of plurality of lighting means groups with different CCT ranges in any combination;

having processing means to instruct said combination of plurality of lighting means groups to provide lighting of a fixed CCT;

characterized in that said lighting means group comprises:

a plurality of lighting means with DWL range of 585 nm and 595 nm a plurality of lighting means with CCT range of 2500K and 3700K;

a plurality of lighting means with CCT range of 3700K and 5000K;

a plurality of lighting means with CCT range of 5000K and 7000K.

In another embodiment, the present invention provides,

A methodology of light feedback system for lighting means (102), the steps comprising:

transmitting light from lighting means (102) through a confined space;

having a certain percentage of said light to be transmitted back towards the lighting means (102) by a reflecting means (100, 204);

characterized in that said reflecting means (100, 204) can reflect back to a sensory means (106) located behind said lighting means (102).

In another embodiment, the present invention provides,

A methodology of light feedback system for lighting means (102), the steps comprising:

transmitting light from lighting means (102) through a confined space;

having certain percentage of said light to be transmitted back towards the lighting means (102) by a reflecting means (204);

characterized in that said reflecting means (204) can reflect back to a sensory means (106) located behind said lighting means (102).

said reflecting means (204) is attached to a focus lens to be placed in front of the lighting means (102) to create a narrower light beam.

BRIEF DESCRIPTION OF THE DRAWINGS

Other aspects of the present invention and their advantages will be discerned after studying the Detailed Description in conjunction with the accompanying drawings in which.

DETAILED DESCRIPTION OF THE DRAWINGS

In the following detailed description, numerous specific details are set forth in order to provide a thorough understanding of the invention. However, it will be understood by those or ordinary skill in the art that the invention may be practised without these specific details. In other instances, well known methods, procedures and/or components have not been described in detail so as not to obscure the invention.

The invention will be more clearly understood from the following description of the preferred embodiments thereof given by way of example only with reference to the accompanying drawings. In the descriptions that follow, like numerals represent like elements in all figures. For example, where the numeral (2) is used to refer to a particular element in one figure, the numeral (2) appearing in any other figure refers to the same element.

Description of one or more embodiments of the invention is provided as follows along with diagrams that illustrate the principles and application of the invention. The invention is described in connection with such embodiments, but invention is not limited to any embodiment. The scope of the invention is limited only by the claims and the invention encompasses numerous alternatives, modifications and equivalents. Numerous specific details are set forth in the following description in order to assist in creating a thorough understanding of the invention. These details are provided for the purpose of example and the invention may be practised according to the claims without some or all of these specific details.

Figure 1:
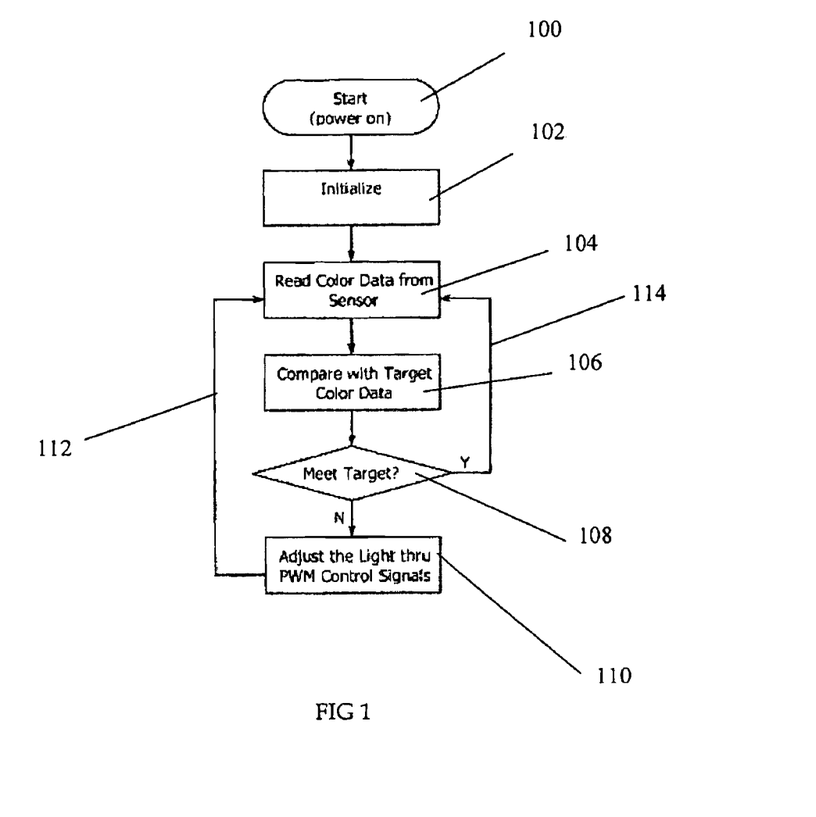
FIG. 1 is a flowchart describing the close-loop mode of the lighting system.

Referring now to FIG. 1, there is shown a flowchart describing the close-loop mode of the lighting system. In the first step (100), when the user turns on the LED lamp, the processing means will instruct the array of LEDs to emit light beams to the intended space, according to the CCT setting that is set by the user. The said array of LEDs comprises any combination of three main groups of LEDs out of four main groups of LEDs wherein the first group comprises LEDs with dominant wavelength (DWL) range of 585 nm and 595 nm, the second group comprises LEDs with CCT range of 2500K and 3700K, the third group comprises LEDs with CCT range of 3700K and 5000K and the fourth group comprises LEDs with CCR range of 5000K and 7000K. The said processing means will instruct the three mentioned groups of LEDs to operate in a suitable pulse width modulation (PWM) in order to emit the white light with the CCT that is set by the user. The brightness of the LED is determined by the PWM of the LED. The LED operates on the concept of modulation of duty cycle whereby the longer the high pulse, the brighter the LED is. This is also with reference to the second step (102). In the third step (104), the sensory means such as colour sensors will read the CCT of the light beam that is being transmitted by the LEDs. Since the sensory means are arranged to be behind the LEDs, a reflection means is arranged in the direction of the LEDs in order to reflect a small percentage of light beam back to the sensory means. The reflection means are usually made of materials that have high transparency such as acrylic. The reflection means are also made in the shape such that the light beams emitted by the LEDs are converged back to the sensory means. This is done by having the reflection means to be in concave shape and being part of the LED lamp housing. Another method is to have protruding edges of different sizes of circles on a flat acrylic reflection means, which will also perform the same function to converge the light beams from the LEDs back to the sensory means located at the back of the LEDs. After the sensory means have read the CCT of the light beam reflected from the reflection means, it will compare with the intended CCT data that is being currently set by the user, which is in step four (106). In step five (108), the processing means will check if the CCT of the environment is the same as the intended CCT. If it is, the lighting system will go back to step three and it will keep comparing in real time in order to maintain the same CCT for the light emitted to the intended space (114). If the CCT of the environment is lower than the intended CCT, the processing means will instruct the group of LEDs with higher CCT to operate in PWM of higher duty cycle in order to adjust it back to the intended CCT (110). Similarly, if the CCT of the environment is higher than the intended CCT, the processing means will instruct the group of LEDs with lower CCT to operate in PWM of higher duty cycle in order to adjust it back to the intended CCT (110). The close-loop process will run in real time in order to maintain the intended CCT set by the user (112).

Figure 2:
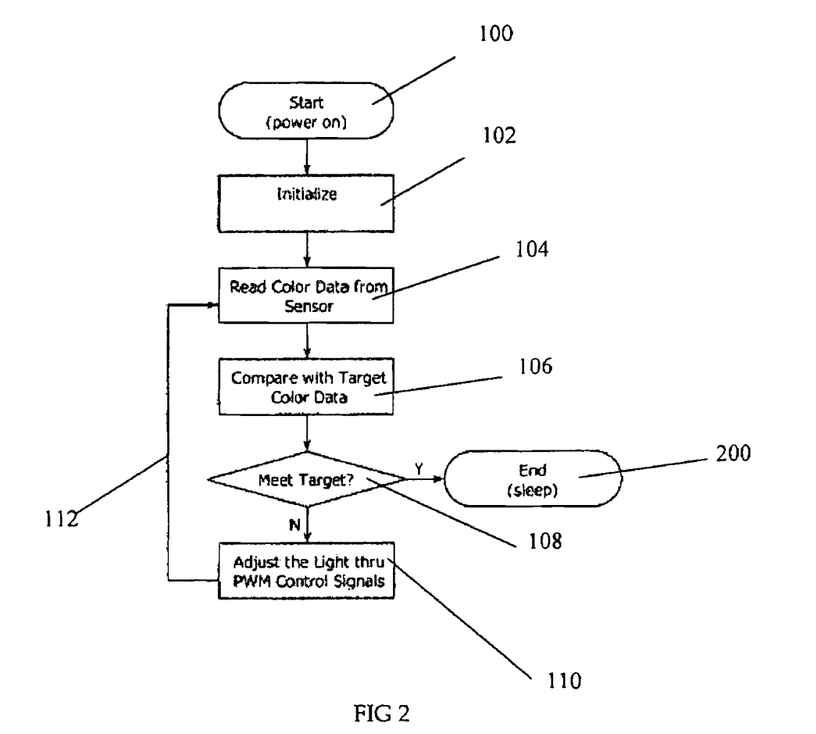
FIG. 2 is a flowchart describing the open-loop mode of the lighting system.

Referring to FIG. 2, there is shown a flowchart describing the open-loop mode of the lighting system. The only difference of said open-loop mode is that if the CCT of the environment is found out to be the same as the intended CCT (108), the processing means and sensory means will stop monitoring the CCT of the environment (200). In other words, it will turn into sleep mode, which will only monitor when the user provides instruction to the lighting system. In this mode, the adjustment of CCT will also be done if it is found that the CCT of the environment is different from the intended CCT.

Figure 3:
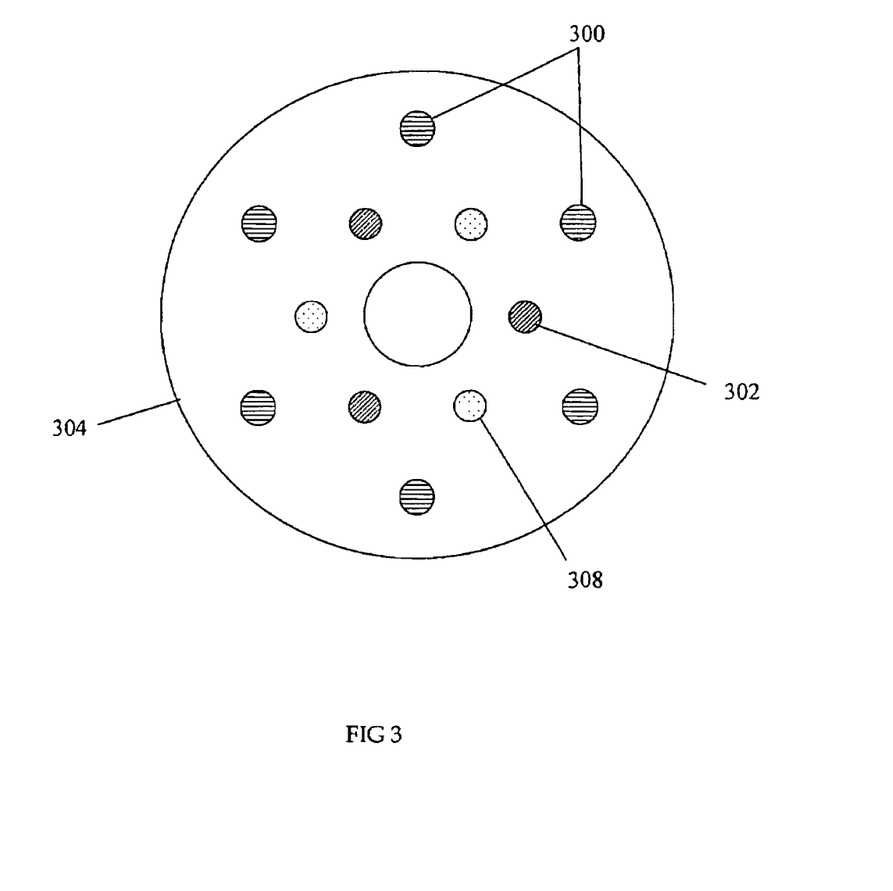
FIG. 3 is diagram showing the arrangement of the LED groups in the LED lamp.

Referring now to FIG. 3, there is shown the arrangement of the LED groups in the LED lamp. There are three groups of LED, wherein each group comprises a plurality of LEDs with a certain range of CCT. These three groups of LED can be any combination of four main groups of LED. The first group of LEDs comprises amber LEDs (300) with DWL range of 585 nm to 595 nm. The second group of LEDs comprises warm-white LEDs (302) with CCT range of 2500K to 3700K. The third group of LEDs comprises white LEDs (308) with CCT range of 3700K to 5000K. The fourth group of LEDs comprises cool white LEDs (not shown) with CCT range of 5000K to 7000K. The quantity of LEDs in the LED lamp can be varied in order to achieve the total white light output with the CCT range of 2500K to 5000K. The arrangement of the LED groups can be varied too in order to achieve the desired CCT. The LEDs are arranged on an LED plate (304) which holds all the LEDs in the LED lamp In this embodiment, three groups of LED are chosen in order to maintain a balance between the cost of the LED lamp and the brightness of the LED lamp. The perceived brightness or power of light is called luminous flux. If only two groups of LED are chosen, the LED lamp will not be able to emit the brightness that is essential to light up the intended space. Recommended colour temperatures for general indoor and task lighting are in the 2700K to 3600K range. Each type of LED has different luminous flux. Amber LED (300) has luminous flux of 35 lm, warm white LED (302) has luminous flux of 70 lm and white LED (308) has luminous flux of 80 lm. If only two groups of LEDs are used, for example six amber LEDs (300) and three warm white LEDs (302), then the total luminous flux would be 420 lm, which is very low for general indoor and task lighting. Another way to increase the luminous flux using only two groups of LED is to increase the quantity of LEDs, but this will incur more cost to the LED lamp.

A processing means is included to the LED lamp to control the usage of the LED groups in order to obtain the desired total CCT for the LED lamp. Said processing means will refer to a certain database in order to determine the pulse width modulation (PWM) for each LED group to operate in order to achieve the desired CCT of the LED lamp.

Figure 4A:
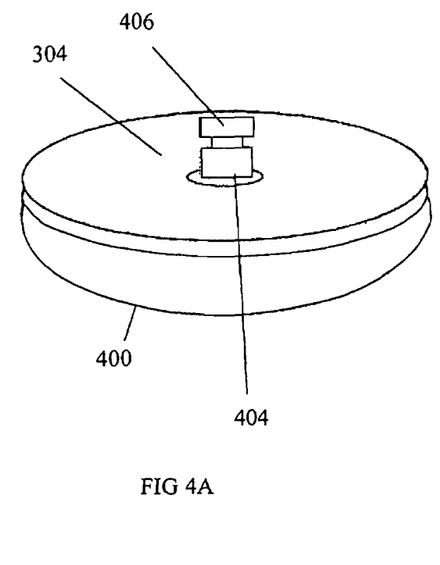
FIG. 4A is a diagram showing the perspective view of the LED lamp (110).

Referring now to FIG. 4A, there is shown a diagram of the perspective view of the LED lamp (410). The LED lamp (410) comprises an LED plate (304), concave reflecting means (400), light guide (404) and sensory means (406). The LED plate (304) has a flat surface and has an opening at the centre in order to fit the light guide (404) and sensory means (406). The concave reflecting means (400) is concave in shape and the circumference fits with the size of the LED plate (304). The LEDs (402) are placed on the LED plate (304) and facing towards the reflecting means (400).

Figure 4B:
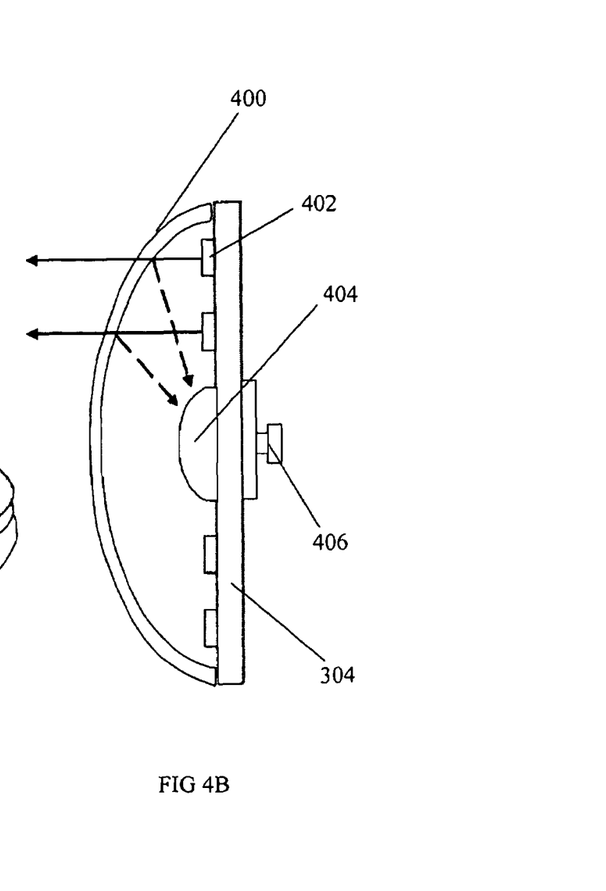
FIG. 4B is a diagram showing the cross sectional view of the LED lamp (110).

Referring now to FIG. 4B, there is shown a diagram of the cross sectional view of the LED lamp (410). The plurality of LEDs (402) is placed on the LED plate (304) and facing towards the concave reflecting means (400). The light beam from the LED (402) is emitted towards the concave reflecting means (400). 95%-97% of the light beam will be transmitted through the concave reflecting means (400) in order to provide lighting to the environment. 3%-5% of the light beams will be reflected back, but towards the light guide (404) due to the shape of the concave reflecting means (400). The light guide (404), which is located at the centre of the LED plate (304), will receive most the 10 reflected light beams from the concave reflecting means (400). The light guide (404) with a large view angle is chosen because it is able to detect a larger amount of light reflected. The light guide (404) will eventually transfer the light beam to the sensory means (406), such as colour sensor, which is located at the other side of the LED plate (304). By having the said flow, the sensory means (406) will be able to measure the CCT of the light beam that is being emitted from the LEDs (402).

The concave reflecting means (400) is made of acrylic material, which is a type of useful and clear plastic that resembles glass. Acrylic material is used for the concave reflecting means (400) because it is transparent up to 97% of visible light, which makes it an efficient material for lighting devices. Besides, the 3% reflection of visible light is also beneficial to reflect back light to the light source for any sort of sensory means (406) to measure the reflected light. Besides acrylic, other materials that exhibit similar characteristics to acrylic can also be used.

Figure 5:
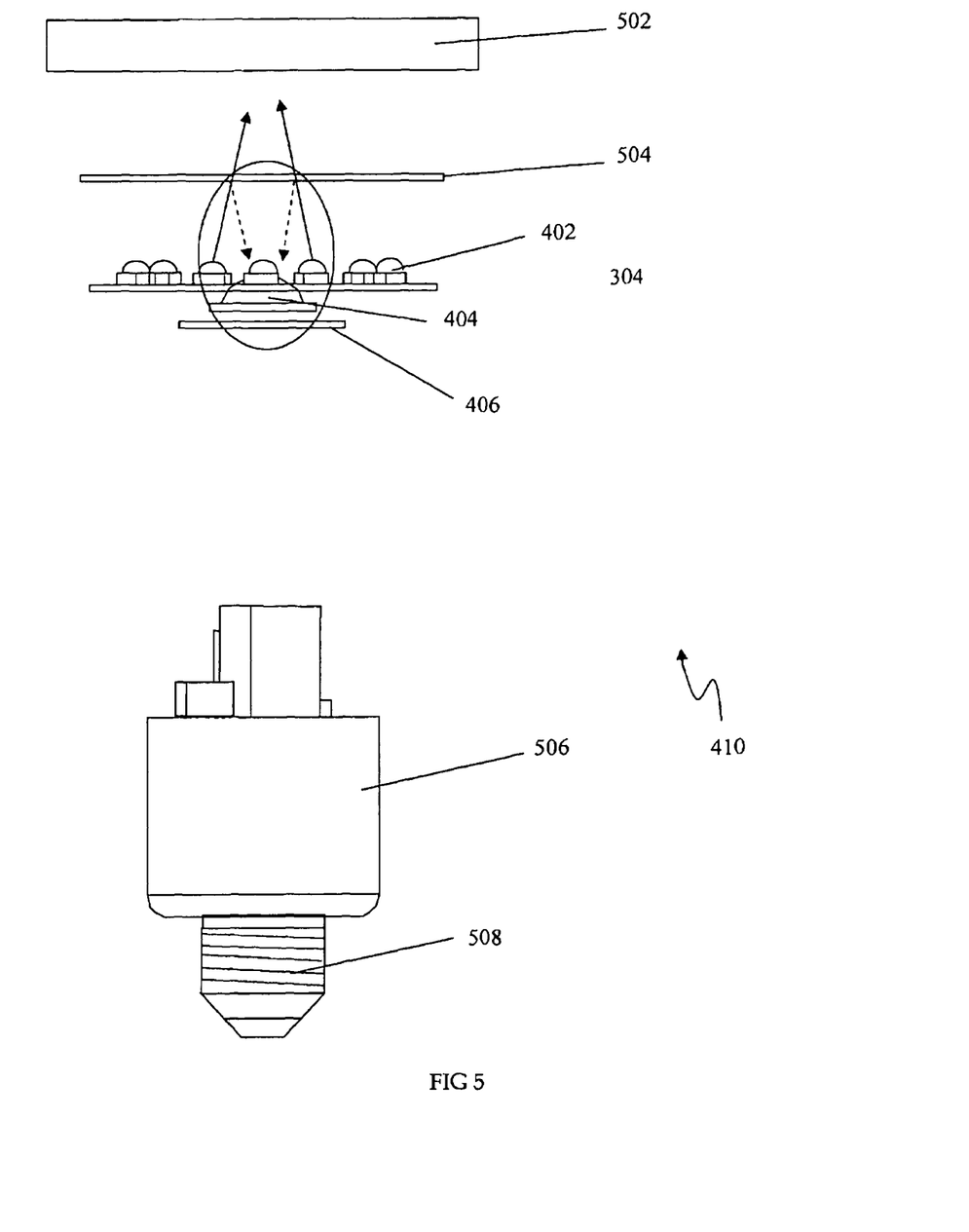
FIG. 5 is a diagram showing the components of the LED lamp (110) in another embodiment.

Referring now to FIG. 5, there is shown a diagram showing the components of the LED lamp (410) in another embodiment. In this embodiment, the LED lamp (410) comprises an array of LEDs (402), an LED plate (304), lens, sensory means (406), flat acrylic reflecting means (504), housing, top cover (502), power supply housing (506) and connector (508). The array of LEDs (402) is attached to the LED plate (304) while the LED plate (304) has an opening in the centre in order to fit the lens and sensory means (406). The LED lamp (410) housing is attached to the top cover (502) and the flat acrylic reflecting means (504) is flat and placed with the top cover (502). The flat acrylics reflecting means (504) have a plurality of protruding edges in the shape of circles in different sizes that converges the light beams emitted from the lighting means (402) and reflect the converged light beams back to the lens. The flat acrylic reflecting means (504) may be without the plurality of protruding edges in the shape of circles in different sizes but percentage of light reflected will be less.

Figure 6:
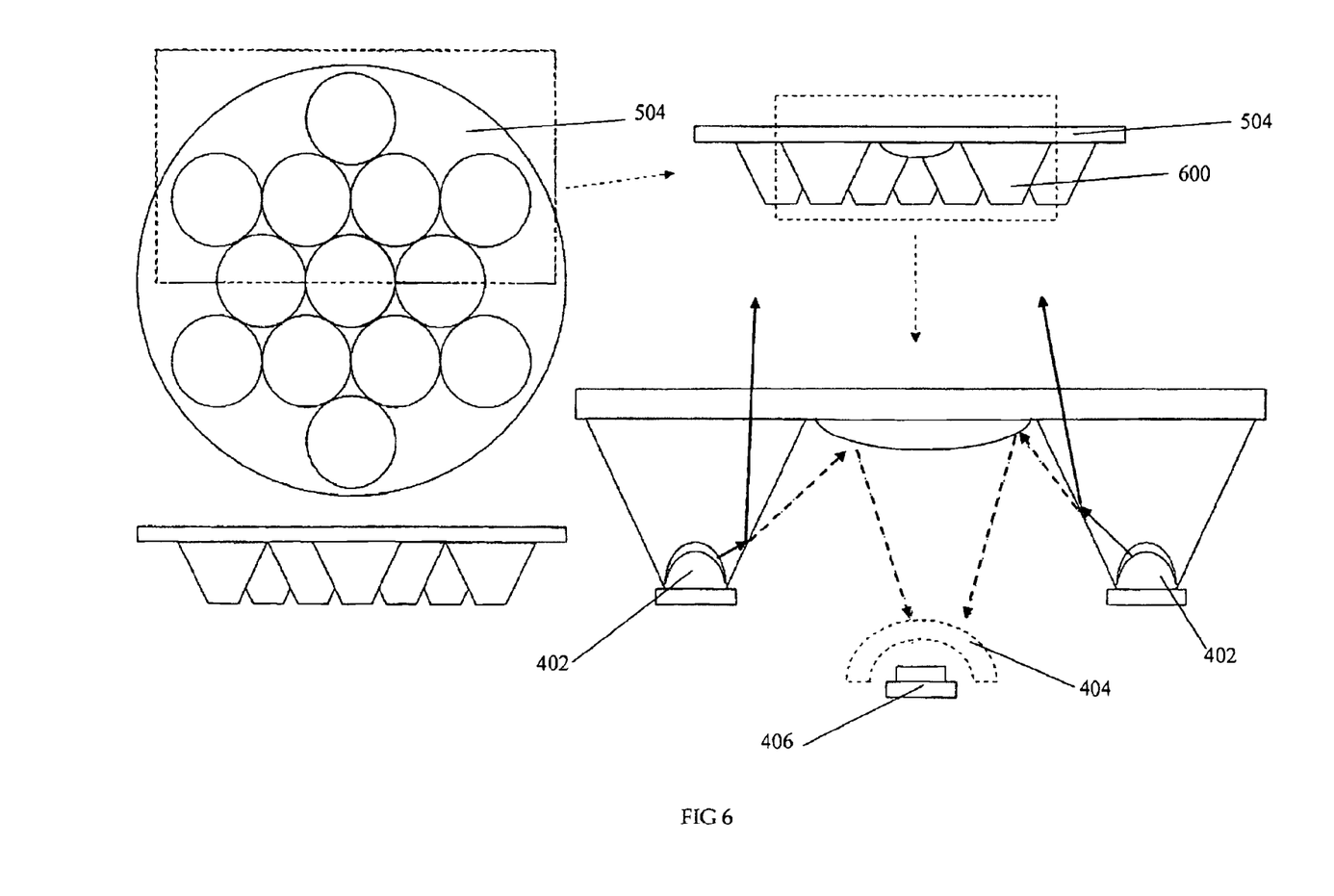
FIG. 6 is a diagram showing the focus lens used in the LED lamp (110) in the second embodiment.

Referring now to FIG. 6, there is shown a diagram showing the focus lens (600) used in the LED lamp (410) in the second embodiment. The quantity of focus lens (600) used should correspond to the quantity of LEDs (402) in the LED lamp (410). In another words, each LED (402) should have one accompanying focus lens (600). The focus lens (600) is in the shape of part of a hollow cone whereby there is an opening at the tips of the hollow cone. The opening is made such that it fits to the size of the LED (402). The base of the focus lens (600) is attached to the flat reflecting means (504). The arrangement of the focus lens (600) is according to the arrangement of the LEDs (402) on the LED plate (304). In the centre of the flat reflecting means (504) is placed a convex mirror that will produce full reflection of the lights received to the sensors (406). Of the entire light beam that is emitted by the LED (402), 95%-97% of it will be maintained in the focus lens (600) and eventually be emitted out from the LED lamp (410). In the meantime, 3%-5% of the light beam will pass out of the focus lens (600) and the light beams that meet the convex mirror will be reflected fully and converged to the sensor (406). There can be an optional light guide (404) in the pathway between the convex mirror and sensor (406) in order to direct more light to the sensor (406).

It will be understood by those skilled in the art that changes and modifications may be made to the invention without departing from the spirit and scope of the invention.

Therefore it is intended that the foregoing description is merely for illustrative purposes and not intended to limit the spirit and scope of the invention in any way but only by the spirit and scope of the appended claim.

What is claimed is:

1. A methodology for maintaining lighting of the white colour at an intended correlated colour temperature (CCT), the steps comprising:
   i. combining any three different groups of light emitting diodes (LEDs) attached on a LED plate, the three different groups selected from the groups consisting of: a plurality of amber LEDs with DWL range of 585 nm to 595 nm, a plurality of warm-white LEDs with CCT range of 2500K to 3700K, a plurality of white LEDs with CCT range of 3700K to 5000K and a plurality of cool white LEDs CCT range of 5000K to 7000K to emit light beams without combining the light beams through a condenser lens;
   ii. providing a reflecting means which the three different groups of LEDs face and are spaced from, the reflecting means transmitting a portion of the light beams and reflecting a portion of the light beams;
   iii. providing a sensory means arranged behind the LEDs to measure the CCT of the reflected light beams reflected from the reflecting means and convert the measured CCT reading to CCT binary data; and
   iv. providing processing means to compare the CCT binary data against the intended CCT binary data and instruct the LEDs to adjust the CCT of the light beams until the intended CCT is obtained.

2. The methodology of claim 1, wherein the processing means instruct the LEDs to transmit a lower CCT of the light beam if the CCT binary data is higher than the intended CCT binary data for a certain acceptable threshold or instruct the LEDs to transmit a higher CCT of the light beam if the CCT binary data is lower than the intended CCT binary data for a certain acceptable threshold until the intended CCT is obtained.

3. The methodology of claim 1, wherein the CCT of the reflected light beams is CCT of the environment.

4. The methodology of claim 1, wherein the reflecting means is made of acrylic.

5. The methodology of claim 1, wherein the sensory means further comprises a light guide to absorb more light.

6. The methodology of claim 1, wherein the reflecting means further comprises attached focus lens to narrow the lighting angle.

7. The methodology of claim 1, wherein the intended CCT is set by user.

* * * * *